(12) United States Patent
Kim

(10) Patent No.: US 11,136,046 B2
(45) Date of Patent: Oct. 5, 2021

(54) METHOD AND SYSTEM OF VEHICLE ALARM THAT ALARM AREA IS CHANGED BY VISIBLE DISTANCE, AND VISION SYSTEM FOR VEHICLE

(71) Applicant: MANDO CORPORATION, Pyeongtaek-si (KR)

(72) Inventor: Dong Myeong Kim, Seongnam-si (KR)

(73) Assignee: Mando Corporation, Pyeongtaek-si (KR)

( * ) Notice: Subject to any disclaimer, the term of this patent is extended or adjusted under 35 U.S.C. 154(b) by 57 days.

(21) Appl. No.: 16/139,589

(22) Filed: Sep. 24, 2018

(65) Prior Publication Data
US 2019/0092347 A1    Mar. 28, 2019

(30) Foreign Application Priority Data

Sep. 25, 2017 (KR) .................. 10-2017-0123253

(51) Int. Cl.
*B60W 50/14* (2020.01)
*B60R 1/00* (2006.01)
*G06K 9/00* (2006.01)

(52) U.S. Cl.
CPC ............. *B60W 50/14* (2013.01); *B60R 1/00* (2013.01); *G06K 9/00791* (2013.01); *G06K 9/00805* (2013.01); *B60R 2300/301* (2013.01); *B60R 2300/802* (2013.01); *B60R 2300/8093* (2013.01); *B60W 2050/143* (2013.01);
(Continued)

(58) Field of Classification Search
CPC ........... B60W 50/14; B60W 2050/143; B60W 2050/146; G06K 9/0079; G06K 9/00798
See application file for complete search history.

(56) References Cited

U.S. PATENT DOCUMENTS

2007/0069873 A1* 3/2007 Kudo .................. B62D 15/029
                                                    340/435
2008/0055114 A1* 3/2008 Kim ....................... G01S 15/86
                                                    340/937

FOREIGN PATENT DOCUMENTS

| JP | 2005-258696 A | 9/2005 |
| JP | 2009-134703 A | 6/2009 |
| KR | 10-1730740 B1 | 4/2017 |

OTHER PUBLICATIONS

Korean Office Action dated Nov. 20, 2018 issued in Korean Patent Application No. 10-2017-0123253.

* cited by examiner

*Primary Examiner* — Curtis B Odom
(74) *Attorney, Agent, or Firm* — Morgan, Lewis & Bockius LLP

(57) ABSTRACT

The present disclosure relates to a system and method of alarm for a vehicle. The present disclosure describes a alarm system for a vehicle for allowing a driver to practice a defensive drive in a weather environment which is hard to recognize the situation around the vehicle. An embodiment provides a alarm system for a vehicle including a camera operable to be disposed at the vehicle so as to have a field of view exterior of the vehicle, where the camera configured to capture image data, an image processor operable to process image data captured from the camera; a plurality of sensors disposed at the vehicle for sensing at least one of a front, side, or rear so as to capture sensing data, an alarm device for alerting a driver when detecting an object located in blind spot of the rear of the vehicle, and controller including at least one of processor configured to process at least one of (i) processing result of the captured image data and (ii) sensing data captured by the plurality of sensors.

15 Claims, 12 Drawing Sheets

(52) U.S. Cl.
CPC ... *B60W 2050/146* (2013.01); *B60W 2420/42* (2013.01); *B60W 2554/00* (2020.02); *B60W 2555/20* (2020.02)

(a)　　　　　　　(b)　　　　　　　(c)

(a)  (b)  (c)

METHOD AND SYSTEM OF VEHICLE ALARM THAT ALARM AREA IS CHANGED BY VISIBLE DISTANCE, AND VISION SYSTEM FOR VEHICLE

CROSS REFERENCE TO RELATED APPLICATION

This application claims priority from Korean Patent Application No. 10-2017-0123253, filed on Sep. 25, 2017, which is hereby incorporated by reference for all purposes as if fully set forth herein.

BACKGROUND OF THE INVENTION

1. Field of the Invention

The present disclosure relates to a system and method of alarm for a vehicle. More specifically, the present disclosure relates to a system and method of alarm for a vehicle for determining a visible distance through a camera and changing an alarm area in accordance with the visible distance.

2. Description of the Prior Art

A vehicle alarm system is a system that recognizes an object such as another vehicle or a pedestrian located in an area which is difficult for the driver to perceive (that is mainly a rear area of the vehicle as a blind spot of the driver) and alerts the driver.

The vehicle alarm system defines an alarm area called a blind spot detection (BSD) area on the rear-side of the vehicle, which is a blind spot of the driver and alert the driver when an object such as another vehicle or a pedestrian is located in the alarm area.

At this time, the prior vehicle alarm system has the same alarm area regardless of the surrounding weather environment. Therefore, in case of weather environment in which the visible distance is reduced due to rain or fog, the driver may attempt to change lanes if no other vehicle exists in the usual alarm area.

In this case, a driver of the other vehicle is so difficult to secure his visibility because of the weather environment, that a collision accident between vehicles may occur due to the late recognition of other vehicle which changed lanes.

SUMMARY OF THE INVENTION

In this background, the present disclosure is to provide a system and method of vehicle alarm for determining visible distances based on image information such as moving images, image data, and the like captured by a camera in a weather environment with a reduced visible distance, and then for reducing the possibility of collision of the vehicle by increasing alarm area based on it.

To solve the foregoing problem, an embodiment provides a alarm system for a vehicle including a camera operable to be disposed at the vehicle so as to have a field of view exterior of the vehicle, where the camera configured to capture image data; an image processor operable to process image data captured from the camera; a plurality of sensors disposed at the vehicle for sensing at least one of a front, side, or rear so as to capture sensing data; an alarm device for alerting a driver when detecting an object located in blind spot of the rear of the vehicle; and, controller including at least one of processor configured to process at least one of (i) processing result of the captured image data and (ii) sensing data captured by the plurality of sensors, wherein the alarm system is operable to determine estimated visible distance of the vehicle based on the image data, wherein the alarm system is operable to determine an alarm area which is used to determine whether the alarm device alerts based on the estimated visible distance.

Another embodiment provides a vision system for a vehicle including a camera operable to be disposed at the vehicle so as to have a field of view exterior of the vehicle, where the camera is configured to capture image data; and an image processor operable to process image data captured from the camera, wherein the vision system is operable to determine estimated visible distance of the vehicle based on the image data.

Another embodiment provides a camera operable to be disposed at the vehicle so as to have a field of view exterior of the vehicle, where the camera is configured to capture image data, wherein the image data is used to determine estimated visible distance of the vehicle, and wherein the estimated visible distance is used to determine alarm area for determining whether the alarm device alerts.

Another embodiment provides a vision system for a vehicle including an image sensor disposed at the vehicle with a field of view exterior of the vehicle, where the image sensor is configured to capture image data; a non-image sensor disposed at the vehicle so as to capture sensing data for sensing one of the objects adjacent at the vehicle; and an domain control configured to process one or more between the image data captured by the image sensor and the sensing data captured by the non-image sensor, wherein the domain control determines the estimated visible distance for the vehicle based in part on the processing of the image data captured by the image sensor and, the domain control is operable to control one or more vehicle control system selected from (i) a Blind Spot Detection (BSD), (ii) an Adaptive Cruise Control (ACC), (iii) a Lane Departure Warning System LDWS), (iv) a Lane Keeping Assist System (LKAS), and (v) a Lane Changing Assist System (LCAS) based in part on the processing of the sensing data captured by the non-image sensor and the estimated visible distance.

Another embodiment provides a method for operating a alarm system for a vehicle, the method comprises capturing image data from a camera which is capable of being disposed at the vehicle with a field of view exterior of the vehicle; determining an estimated visible distance for the vehicle based on the image data by image processor which is operable to process the image data captured from the camera; and determining alarm area used to determine whether an alarm device alerts based on the estimated visible distance.

The present disclosure allows a driver to practice a defensive drive in a weather environment which is hard to recognize the situation around the vehicle, thereby assuring safety of the driver.

DETAILED DESCRIPTION OF THE EXEMPLARY EMBODIMENTS

Figure 1:
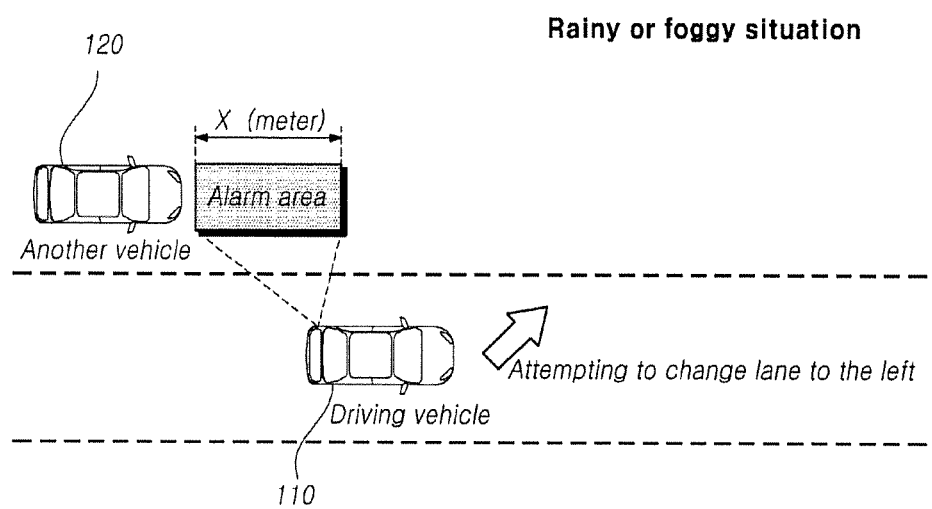
FIG. 1 shows an example of an operation of a vehicle in a rain or fog according to a conventional vehicle alarm system.

Hereinafter, embodiments of the present disclosure will be described in detail with reference to the accompanying drawings. In adding reference numerals to elements in each drawing, the same elements will be designated by the same reference numerals, if possible, although the elements are shown in different drawings. Further, in the following description of the present disclosure, a detailed description of known elements and functions incorporated herein will be omitted when it is determined that the description may make the subject matter of the present disclosure rather unclear.

In addition, when describing elements of the present disclosure, terms such as first, second, A, B, (a), (b), and the like may be used. These terms are only used to distinguish one element from another element, and these are not intended to limit the essence, order, or sequence of the corresponding element. It will be understood that when an element is referred to as being "linked to," "coupled to," or "connected to" another element, it may be directly connected or coupled to another element, but one of more intervening element may be "linked," "coupled," or "connected" between each element.

Hereinafter, the present disclosure will be described in detail with reference to the accompanying drawings.

A vehicle alarm system alerts a driver to the location of another vehicle or pedestrian in a predefined alarm area.

At this time, it is difficult for the driver to handle quickly an urgent change of a surrounding environment due to reduced visible distance in case of rain or fog. Therefore, it is necessary to secure time for the driver to adjust an alarm area to handle the change of a weather condition for the purpose of securing the safety of the driver. However, prior vehicle alarm system does not have the function of adjusting the alarm area considering the weather conditions.

FIG. 1 shows an example of an operation of a vehicle in a rain or fog according to a conventional vehicle alarm system.

Referring to FIG. 1, alarm area for rear direction of a vehicle in a rainy or foggy situation is determined as same as the situation of clear weather in prior rear-side alarm device of a driving vehicle 110. At this time, it is assumed that a length of lane direction of the alarm area is X (meter).

In this case, since another vehicle 120 is not located in the alarm area, a driver of the driving vehicle 110 attempts to change lane to the left lane because the rear-side alarm device of the driving vehicle 110 does not alert.

Figure 2:
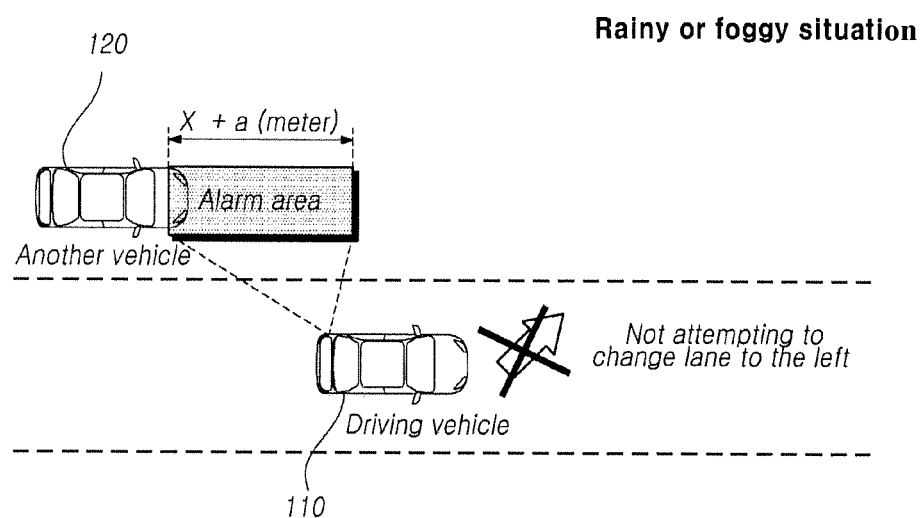
FIG. 2 shows an example of an operation of a vehicle in a rain or fog according to an improved alarm system for a vehicle by the present disclosure.

At this time, another vehicle 120 does not recognize the driving vehicle 110 which has moved to the left lane because of reduced visible distance due to rain or fog, and thus there is a high possibility of an accident. FIG. 2 shows an example of an operation of a vehicle in a rain or fog according to an improved alarm system for a vehicle by the present disclosure.

Referring to FIG. 2, a rear side alarm device of the driving vehicle 110 defines an alarm area that is further extended to the rear direction of the driving vehicle 110 in a rainy or foggy situation, than in the case of clear weather. At this time, the alarm area is extended by increasing the length of lane direction, and the length of lane direction for the extended alarm area is assumed to be X+a (meter).

The extended value "a" of the length of lane direction for the extended alarm area may vary depending on the visible distance. For example, the value of "a" may be extended in proportion to the visible distance. In another example, the value of "a" may be extended in proportion to the exponential or log of the visible distance.

In this case, since another vehicle 120 is located in the alarm area, a driver of the driving vehicle 110 does not attempt to change lane to the left lane because the alarm device of the driving vehicle 110 alerts. Therefore, it is possible to prevent another vehicle 120 from colliding with the driving vehicle 110.

Thus, it is first necessary to accurately determine the current visible distance in order to adjust the alarm area of the vehicle alarm system.

One of the methods for determining the visible distance generally used in a vehicle is a method of using a rain sensor or a method of measuring visible distance information by communicating with outside.

However, the method of measuring substantially visible distance by a driver using the rain sensor has some limitation. The rain sensor may measure the amount of raindrop by detecting infrared wavelength, and provide weather information (e.g., fog, rainfall state) around the vehicle based on the detection. However, the visible disturbance experienced by a driver is also influenced by various environmental factors such as whether it is daytime or nighttime, and whether there is a surrounding object.

In addition, the result of measuring visible distance information by communicating with outside may also be different from the visible distance actually experienced by a driver. This is cased by the fact that the above method calculates the visible distance using approximate environmental information of a driver rather than the actual environment the driver is at.

Therefore, it is preferable to estimate a visible distance definitely using information that most closely matches the external situation which is actually seen by the driver in a vehicle, and it is the most accurate way to estimate the visible distance. By using a camera, it is most accurate to estimate information of the external situation which is actually seen by the driver. Accordingly, it is preferable to estimate a accurate visible distance by capturing an image of external situation using a camera and then analyzing the captured image to estimate the visible distance, rather than using a rain sensor or communicating with outside.

Meanwhile, image information captured from a camera may mean video information captured from the camera since the video information is composed of image data. Hereinafter, the image information captured from a camera means image data captured from a camera in the present disclosure.

In this case, if a large amount of resources are used and a long time is required to analyze the image information captured from a camera, it can be a problem that the estimated visible distance does not reflect the current situation when the around environment of the vehicle is rapidly changed. Therefore, it is required for a method to estimate a visible distance closest to the driver's perception while using less resources as quickly as possible.

To this end, present disclosure provides a method and system of vehicle alarm for estimating a visible distance based on image information captured from a camera and then extending an alarm area based on the estimated visible distance.

Figure 3:
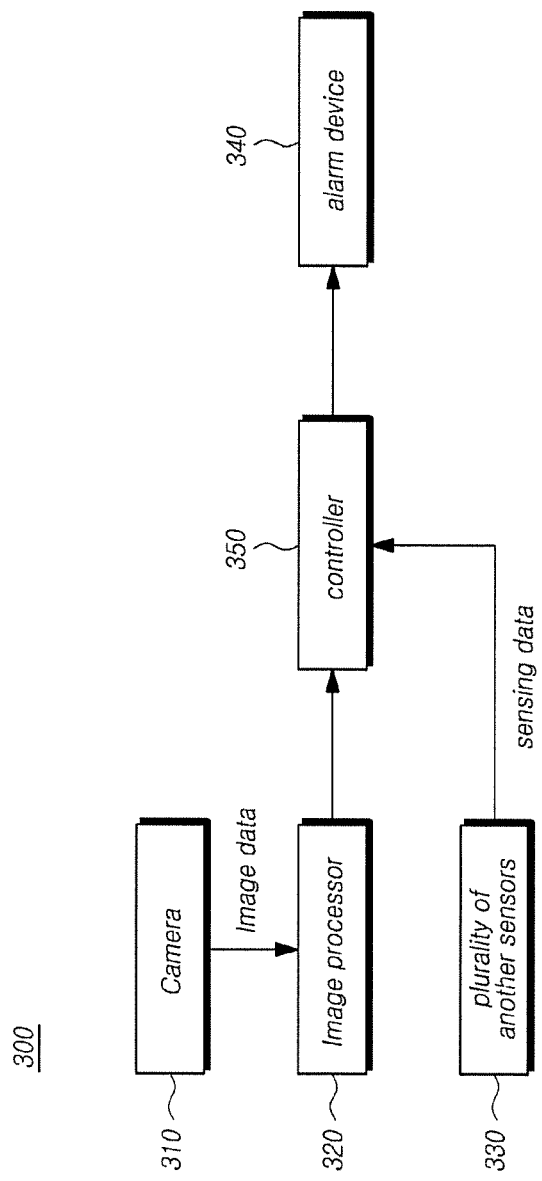
FIG. 3 is a schematic diagram related to a alarm system for a vehicle according to an embodiment of the present disclosure.

FIG. 3 is a schematic diagram related to a alarm system for a vehicle according to an embodiment of the present disclosure.

Referring to FIG. 3, the alarm system for a vehicle 300 may include a camera 310, an image processor 320, a plurality of other sensors 330, a controller 350 and an alarm device 340.

The camera 310 is configured to capture image data that can be disposed at the vehicle to have a view of the exterior of the vehicle.

At this time, the camera 310 may be positioned at front, side, or rear of the vehicle.

An example format of the image data captured from the camera 310 will be one of raw type AVI, MPEG-4, H.264, DivX, or JPEG.

The image processor 320 is operable to process the image data captured form the camera 310. For example, an operation of processing the image data described in FIGS. 6 to 8 which will be described below, may be executable by the image processor 320.

A plurality of other sensors 330 may be disposed at the vehicle to capture sensing data to detect front, side, or rear of the vehicle. Examples of the plurality of other sensors 330 include more than one of a Radar, a Lidar, or an ultrasonic sensor.

The alarm device 340 may alert to the driver when detecting an object located in the rear-side blind spot of the vehicle. An example of the alarm device is a Blind Spot Detection (BSD) device.

The controller 350 is configured to receive (i) the result of processing the captured image information from the image processor 320, receive (ii) the sensing data captured from the plurality of other sensors 330, and process at least one of (i) and (ii). The controller 350 may include at least one processor for such processing.

The alarm system for a vehicle 300 described above can determine the estimated visible distance of the vehicle, that is, the estimated value of the visible distance, based on the image data captured from the camera 310.

At this time, as an example of a method for determining the estimated value of the visible distance, the alarm system for a vehicle 300 recognizes a lane or lanes based on the image data, and estimates the visible distance based on a length of the recognized lane(s).

Recognizing lane(s) on the road means that the driver's view is secured by the length of the recognized lane(s). Therefore, it is possible to estimate the visible distance based on the length of the recognized lane(s).

As another example of a method for determining the estimated value of the visible distance, the alarm system for a vehicle 300 may estimate a visible distance based on a difference value of comparing the predefined reference image data with the image data described above, and based on the visible distance corresponding to the reference image data.

An estimated visible distance can be determined by obtaining a difference value of comparing the predefined reference image information with the image information described above as a ratio (%), and then multiplying the difference value by the visible distance corresponding to the reference image information.

As another example of a method for determining estimated value of the visible distance, the alarm system for a vehicle 300 may extract a visible region based on the image data described above and estimate a visible distance based on the extracted visible region information.

Analyzing the area of the image data captured from the camera, some region become visible region where the driver can recognize the movement of objects due to meaningful variation of the image over time, and other region become invisible region where the driver can not recognize the movement of objects due to meaningless variation or disorder of the image over time.

Thus, the alarm system for a vehicle 300 extracts a visible region and estimates a visible distance from the visible region.

Detailed contents related to the method of determining the estimated visible distance will be described later with reference to FIG. 6 to FIG. 11.

Also, the alarm system for a vehicle 300 may define an alarm area used to determine whether the alarm device 340 alerts based on the estimated visible distance described above.

As an example, the alarm system for a vehicle 300 may define that the size of the alarm area is proportional to the estimated visible distance.

As another example, the alarm system for a vehicle 300 may extend the size of the alarm area when the estimated visible distance is less than or equal to a predefined threshold value.

At this time, the extension for the size of the alarm area may be configured to parallel direction of the road lane passing by the vehicle. In addition, the extension for the size of the alarm area may be configured to vertical direction of the road lane passing by the vehicle.

Figure 4:
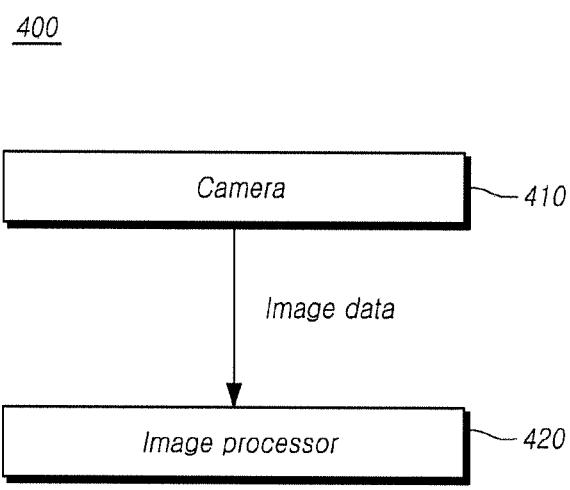
FIG. 4 is a schematic diagram related to a vision system for a vehicle according to an embodiment of the present disclosure.

FIG. 4 is a schematic diagram related to a vision system for a vehicle according to an embodiment of the present disclosure.

Referring to FIG. 4, the vision system for a vehicle 400 may include a camera 410 and an image processor 420.

The camera 410 is configured to capture image data that can be disposed at the vehicle to have a view of the exterior of the vehicle.

At this time, the camera 410 may be positioned at front, side, or rear of the vehicle.

An example format of the image data captured from the camera 410 will be one of raw type AVI, MPEG-4, H.264, DivX, or JPEG.

The image processor 420 is operable to process the image data captured form the camera 410. For example, an operation of processing the image data described in FIGS. 6 to 8 which will be described below, may be executable by the image processor 420.

The vision system for a vehicle 400 can determine the estimated visible distance of the vehicle, that is, the estimated value of the visible distance, based on the image data captured from the camera 410.

At this time, as an example of a method for determining the estimated value of the visible distance, the vision system for a vehicle 400 recognizes a lane or lanes based on the image data, and estimates the visible distance based on length of the recognized lane(s).

Recognizing lane(s) on the road means that the driver's view is secured by the length of the recognized lane(s). Therefore, it is possible to estimate the visible distance based on the length of the recognized lane(s).

As another example of a method for determining the estimated value of the visible distance, the vision system for a vehicle 400 may estimate a visible distance based on a difference value of comparing the predefined reference image data with the image data described above, and based on the visible distance corresponding to the reference image data.

An estimated visible distance can be determined by obtaining a difference value of comparing the predefined reference image information with the image information described above as a ratio (%), and then multiplying the different value by the visible distance corresponding to the reference image information.

As another example of a method for determining estimated value of the visible distance, the vehicle vision system 400 may extract a visible region based on the image data described above and estimate a visible distance based on extracted visible region information.

Analyzing the area of the image data captured from the camera, some region become visible region where the driver can recognize the movement of objects due to meaningful variation of the image over time, and other region become invisible region where the driver can not recognize the movement of objects due to meaningless variation or disorder of the image over time.

Thus, the vision system for a vehicle 400 may extract a visible region and estimate a visible distance from the visible region.

In another embodiment, the vision system for a vehicle may further include an Domain Control Unit (DCU) as an domain control. The DCU may calculate estimated visible distance based on image data or the like, and controls various Driver Assistance Systems (DAS) based on the estimated visible distance and sensing information detected from non-image sensors (e.g., radar, ultrasonic sensors.

More specifically, a vision system for a vehicle as one embodiment includes a camera disposed at the vehicle for capturing image data with exterior view of the vehicle, a non-image sensor disposed at the vehicle like a radar, ridar, or ultrasonic sensor for capturing sensing data to detect one of the surrounding objects of the vehicle, and domain control for processing one or more between the image data captured from the camera and sensing data captured from the non-image sensor, and controlling one or more of various Driver Assistance Systems (DAS).

At this time, the domain control may determine the estimated visible distance of the camera using at least processing of the image data captured from the camera, and such determination of the visible distance information is the same as described below. To avoid overlapping, the explanation is omitted.

In addition, the domain control may control Driver Assistance Systems (DAS) like Blind Spot Detection (BSD), Adaptive Cruise Control (ACC), Lane Departure Warning System (LDWS), or Lane Keeping Assist System (LKAS), based on the above estimated visible distance from the result of processing the sensing data captured form the non-image sensor.

More specifically, the domain control according to the present embodiment may vary the size of the alarm area of the Blind Spot Detection (BSD) system for warning of an obstacle behind the vehicle based on the estimated visible distance.

Further, the domain control may vary the size of recognition region for the front vehicle or determination region for the following vehicle according to the Adaptive Cruise Control (ACC) system based on the estimated visible distance. Otherwise, the domain control unit may vary the size of the departure warning region or departure determination region for the Lane Departure Warning System (LDWS) based on the estimated visible distance.

Further, the domain control may vary the size of the lane keeping determination region or the lane departure warning region according to the Lane Keeping Assist System (LKAS) based on the estimated visible distance. Otherwise, the domain control unit may vary the determination region for the lane change completion or alarm area for alerting the approaching vehicle when changing lane according to the Lane Change Assist System (LCAS) based on the estimated visible distance.

However, the present embodiment is not limited to this Driver Assistance Systems (DAS), and may be applied to all the type of module of the Driver Assistance Systems (DAS) to which the estimated visible distance could be applied. In addition to the configuration for varying the alarm area according to the estimated visible distance, it may include all systems which may vary parameters related to the visible distance among the various control parameters of the Driver Assistance Systems (DAS).

Figure 5:
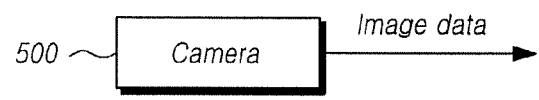
FIG. 5 is a schematic diagram of a camera according to an embodiment of the present disclosure.

FIG. 5 is a schematic diagram of a camera according to an embodiment of the present disclosure.

The camera 510 is configured to capture image data that can be disposed at the vehicle to have a view of the exterior of the vehicle.

At this time, the camera 510 may be positioned at front, side, or rear of the vehicle.

An example format of the image data captured from the camera 510 will be one of raw type AVI, MPEG-4, H.264, DivX, or JPEG.

The image data captured from the camera 510 may be used to determine the estimated visible distance, i.e., the estimated value of the visible distance of the vehicle.

At this time, as an example of a method for determining the estimated value of the visible distance, one or more lane may be recognized based on the image data, and the visible distance may be estimated based on length of the recognized lane(s).

Recognizing lane(s) on the road means that the driver's view is secured by the length of the recognized lane(s). Therefore, it is possible to estimate the visible distance based on the length of the recognized lane(s).

As another example of a method for determining the estimated value of the visible distance, the visible distance may be estimated based on a different value of comparing the predefined reference image data with the image data described above, and based on the visible distance corresponding to the reference image data.

An estimated visible distance may be determined by obtaining a difference value of comparing the predefined reference image information with the image information described above as a ratio (%), and then multiplying the difference value by the visible distance corresponding to the reference image information.

As another example of a method for determining estimated value of the visible distance, a visible region is extracted based on the image data described above and then a visible distance may be estimated based on extracted visible region information.

Analyzing the area of the image data captured from the camera, some region become visible region where the driver can recognize the movement of objects due to meaningful variation of the image over time, and other region become invisible region where the driver can not recognize the movement of objects due to meaningless variation or disorder of the image over time.

Also, the estimated visible distance may be used to determine an alarm area which is used for an alarm device to determine alarm or not.

As an example, the vehicle alarm system 300 may determine the size of the alarm area being proportional to the estimated visible distance.

As another example, the vehicle alarm system 300 may extend the size of the alarm area when the estimated visible distance is less than or equal to a predefined threshold value.

At this time, the extension for the size of the alarm area may be configured to parallel direction of the road lane passing by the vehicle. In addition, the extension for the size of the alarm area may be configured to vertical direction of the road lane passing by the vehicle.

Figure 6:
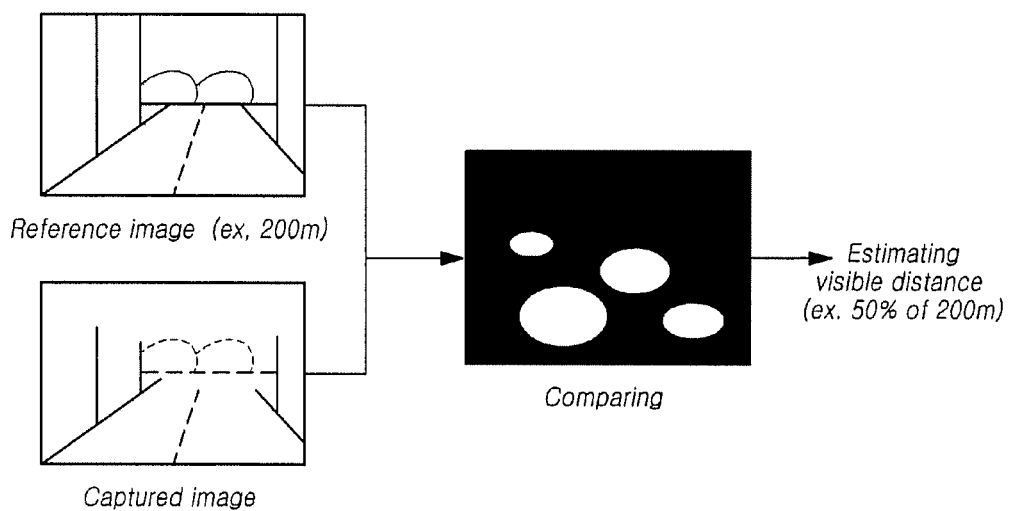
FIG. 6 is a diagram illustrating a process of extracting a visible region from image information according to an embodiment of the present disclosure.

FIG. 6 is a diagram illustrating a process of extracting a visible region from image information according to an embodiment of the present disclosure.

Referring to FIG. 6, reference image information necessary for estimating visible distance can be defined in advance. As an example of the reference image information, it may be image information captured by camera in a clear weather, not in a rainy or foggy situation at the current position of the vehicle.

If reference image information and reference value of visible distance corresponding to the reference image information is predefined in advance, any visible distance may be estimated by calculating a difference value, which is obtained by comparing the image information captured from the camera with the reference image information, and then by multiplying the ratio of the difference value to the reference visible distance corresponding to the reference image information.

That is, it is assumed that there is a reference image for the current position of the vehicle when the weather is clear, and the visible distance at this time is, for example, 200 m. A different value may be obtained by comparing the overall brightness or saturation of the image captured from current camera with the reference image. If the difference value of ration is 50%, the current visible distance may be estimated to be 100 m that is 50% of 200 m.

On the other hand, when estimating the visible distance, a method may be used by extracting visible region information from the image information and then estimating visible distance based on extracted visible region information instead of the method for estimating the visible distance without extracting the visible region as described above.

Figure 7:
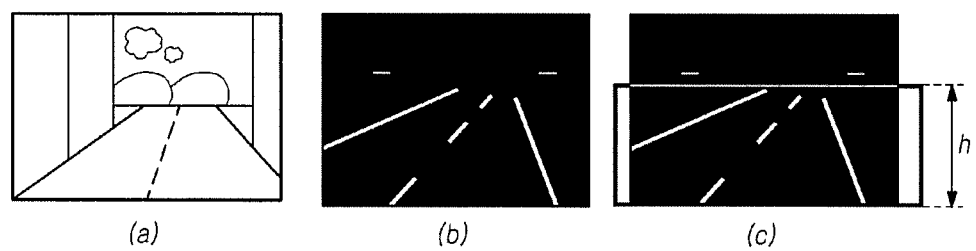
FIG. 7 is a diagram illustrating a process of extracting a visible region from image information according to another embodiment of the present disclosure.

FIG. 7 is a diagram illustrating a process of extracting a visible region from image information according to another embodiment of the present disclosure.

Referring to FIG. 7, FIG. 7(*a*) is image information captured from a camera. The pre-processed image may be generated by pre-processing the image information captured from the camera.

Since some noise may be included in extracting the image from the image information captured from the camera, the accuracy of extracted visible region is increased by the pre-processing for reducing the noise of the image.

At this time, one or more method of median filtering, sharpening, and gaussian filtering may be used to pre-process the image information.

The median filtering is a filtering method for removing noise by making the pixel values in a specific region within the image extracted from the image information equal to the median value of that region.

The sharpening is a filtering method that gives a weight corresponding to a specific mask within a specific region within the image extracted from the image information to sharpen a blurred image.

The gaussian filtering is a method using a Gaussian normal distribution with average value of "0", and is a method that gives a smaller weight as far away two-dimensionally from center of a specific region within the image extracted from the image information.

Once the pre-processed image is generated, an edge image may be generated using the pre-processed image described above.

An edge image means an image composed of edge components detected from the pre-processed image. Here, the detected edge may be an edge of a lane, an edge of an environment including another vehicle or a pedestrian, or an edge generated due to a noise of an image.

Thus, an edge detection algorithm for removing fault edge due to a noise may be used when generating an edge image.

As an example of an edge detection algorithm for removing fault edge is a well-known Canny edge detection algorithm.

Generating the edge image, one or more lane structure may be estimated from the edge image. Various edge types, for example circle and rectangle as well as straight line, may be included in the edge image. In here, it is necessary for an algorithm to extract only contour of the straight line because the edge must have straight line to be estimated lane structure.

At this time, well-known Hough transform algorithm may be used as an example of an algorithm for extracting only contour of the straight line.

FIG. 7(*b*) shows a result of the estimated lane structure extracted from the image information. At this time, it cannot be confirmed that all the types of the extracted lane structures are included in the visible region. This is a reason why it is possible that the image of the invisible region has a shape similar to the lane inherently. Therefore, only some part is needed to select as a visible region within entire area that estimated lane structure exists.

As an example, it may be selected a region as a visible region that has a minimum longitudinal length including estimated lane structure more than predefined threshold ratio.

Although it may be various areas including lane structure more than predefined threshold ratio among the entire estimated lane structure, a region having a minimum longitudinal length may be selected as the visible region. In FIG. 7(*c*), it is shown a visible region in which the ration of the estimated lane structure is more than threshold ratio and the longitudinal length "h" is the smallest value.

In this case, it is possible to weight on each estimated lane structure in order to determine whether ratio of the estimated lane structure is more than threshold ratio within the area, but as another example, it is possible to weight on lower part of the edge image being extracted the estimated lane structure.

This is the reason why it is highly likely that the lower part of the edge image include more important information for determining the visible distance because the lower part of the edge image represents information about an area close to a driver comparing with the upper part of.

Figure 8:
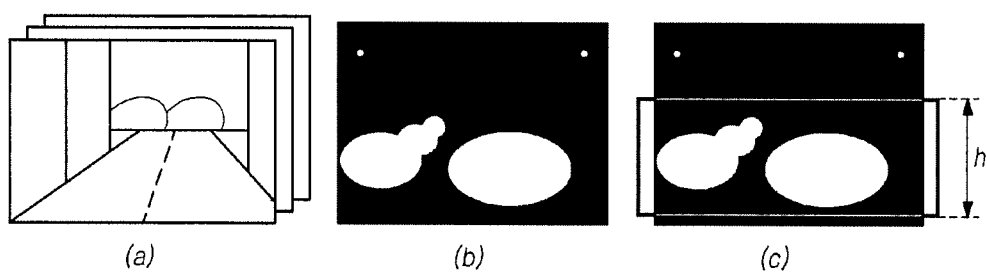
FIG. 8 is a diagram illustrating a process of estimating a visible distance by comparing predefined reference image information and image information captured by a camera according to another embodiment of the present disclosure.

FIG. 8 is a diagram illustrating a process of estimating a visible distance by comparing predefined reference image information and image information captured by a camera according to another embodiment of the present disclosure.

Referring to FIG. 8, a plurality of image frames can be extracted from the image information captured from the camera.

As an example method of extracting an image frame, the image frame may be extracted at predefined time intervals. As another example method of extracting an image frame, the image frame may be extracted according to a predefined time pattern. FIG. 8(a) shows a plurality of image frames extracted from the image information.

For the extracted plurality of image frames, one or more image pixels are likely to be changed in. If a value of an image pixel at a specific position changes for a plurality of image frames captured at different times, this means that an object should be moved. At this time, the changed image pixel is likely to be included in the visible region.

However, since the value of the image pixel may be changed due to a noise rather than motion of the object, the visible region may be so extracted precisely by extracting only image pixels changed over than predefined threshold value as to remove any change owing to a noise.

FIG. 8(b) shows an binary coded image obtained by changing image pixels, which are changed over than a threshold value within a plurality of extracted image frames, to "0" (white color) and by changing other image pixels to "1" (black color).

At this time, we cannot determine that all image pixels with changed value are included in the visible region. This is the reason why some image pixels within non-visible region may be changed due to noise or change of external environment (motion of rain or fog). Therefore, only some region within the image pixels with changed value may be determined as the visible region.

As an example, some region with a minimum longitudinal length among what has changed value of image pixel over than predefined threshold ratio may be determined as visible region. Since regions including image pixels with changed value of image pixel over than threshold ratio within all image pixels may be many, specific regions with a minimum longitudinal length may be extracted as a visible region. FIG. 8(c) shows a visible region with minimum longitudinal length "h" where has changed value of image pixels over than threshold ratio.

At this time, each image pixel may be given a predefined weight in order to determine whether or not the image pixels with the changed value over than the threshold ratio are included in the visible region.

Further, another example method for determining whether an image pixel with changed value over than predefined threshold ratio is included in the visible region is that lower part of the image frame has more weight. This is the reason why it is highly likely that the lower part of the image frame includes more important information for determining the visible distance because the lower part of the image frame represents information about an location close to a vehicle comparing with the upper part of.

After extracting the visible region, visible distance may be estimated based on at least one of a longitudinal length of the visible region, a height of the camera from ground, or an angle between the camera and the ground.

Figure 9:
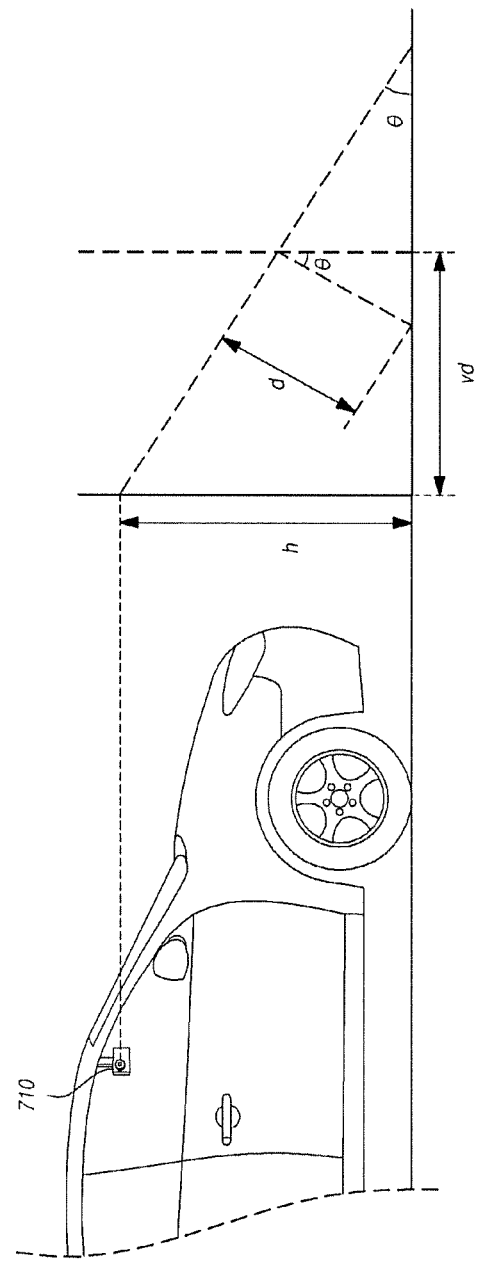
FIG. 9 is a diagram illustrating a method for estimating a visible distance based on a longitudinal length of a visible region, a height of a camera from the ground, or an angle between the camera and the ground according to one embodiment of the present disclosure.

FIG. 9 is a diagram illustrating a method for estimating a visible distance based on a longitudinal length of a visible region, a height of a camera from the ground, or an angle between the camera and the ground according to one embodiment of the present disclosure.

Referring to FIG. 9, the camera 710 may be disposed at a vehicle in a state that inclined toward ground with certain angle not completely horizontal with respect to the ground. At this time, the angle between the camera 710 and the ground becomes θ (theta). And the camera 710 is not attached to the ground but may have a height "h" from the ground. In this case, "vd" is defined as the visible distance to be estimated.

At this time, the longitudinal length of the visible region in the image information captured from the camera 710 is "d". In this case, because the ratio of "d*(cos θ)" between "h/(tan θ)" and the ratio of "h" between "vd+h/(tan θ)" is the same, the visible distance "vd" can be calculated.

Figure 10:
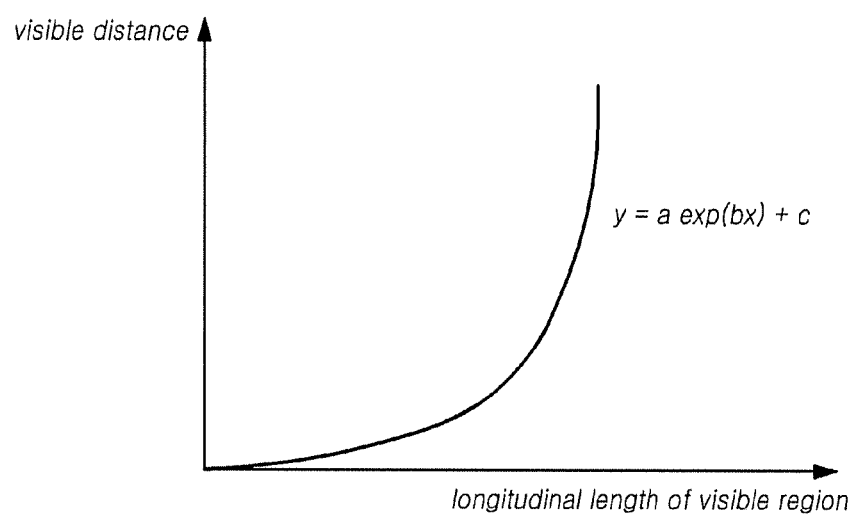
FIG. 10 is diagram showing a relationship between a longitudinal length of a visible region and a visible distance according to an embodiment of the present disclosure.

FIG. 10 is diagram showing a relationship between a longitudinal length of a visible region and a visible distance according to an embodiment of the present disclosure.

Referring to FIG. 10, estimated value of the visible distance may increase in proportion to the exponential of the longitudinal length of the visible region.

Capturing an image from the camera, lower part of the captured image is an image for a region close to the camera, but the higher upper part of the captured image is further far from the camera. Therefore, the ratio of the distance to a corresponding longitudinal length of the image increases from the lower part to the upper part of the image.

Therefore, the graph of the longitudinal length (x) and the visible distance (y) for the entire visible region is not linear function with a form "y=ax+b" (a and b are coefficients determined by the measurement value) but an exponential function with a form "y=a exp(bx)+c" (where a, b, and c are coefficients determined by the measurement value).

Figure 11:
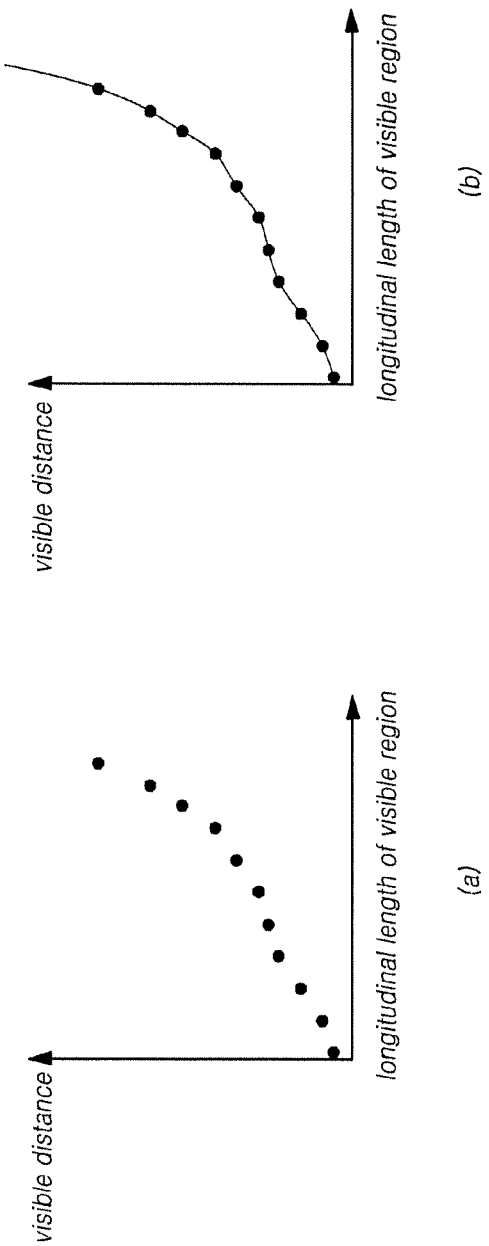
FIG. 11 is a diagram showing a relationship between a longitudinal length of a visible region and a visible distance according to another embodiment of the present disclosure.

FIG. 11 is a diagram showing a relationship between a longitudinal length of a visible region and a visible distance according to another embodiment of the present disclosure.

Referring to FIG. 11, a function for obtaining estimated visible distance may be a curved function extracted from a non-linear curve fitting method using a plurality of pre-defined samples, which is not determined in advance.

At this time, an example of the plurality of samples above may be a pair of the longitudinal length of the visible region and the visible distance.

A concrete example of the non-linear curve fitting method may be one of a Newton method, a Gauss-Newton method, and a Levenberg-Marquardt method.

FIG. 11(a) is a graph showing a sample of a plurality of predefined pairs (longitudinal length of visible region, and visible distance). When drawing a curved function by using the non-linear curve fitting method from the above sample, FIG. 11(b) is obtained as the curved function. By substituting the longitudinal length of the extracted visible region into the curved function, a value of the estimated visible distance can be obtained.

Figure 12:
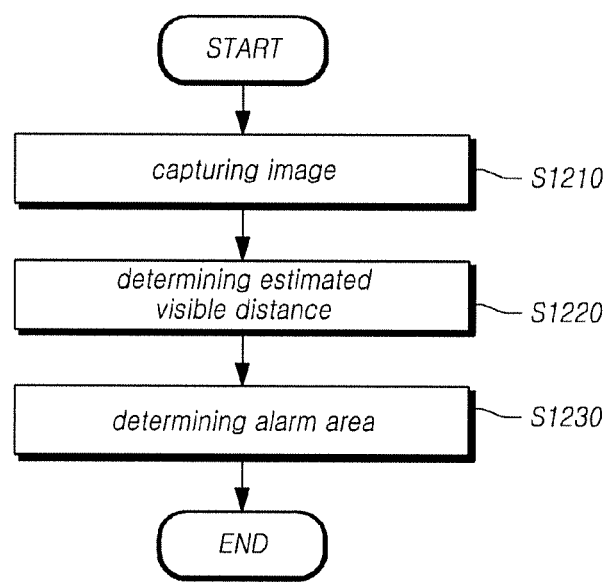
FIG. 12 is a flowchart illustrating a procedure related to a method of a alarm for a vehicle according to an embodiment of the present disclosure.

FIG. 12 is a flowchart illustrating a procedure related to a method of a vehicle alarm according to an embodiment of the present disclosure.

Referring to FIG. 12, a method of a vehicle alarm may include a step S1210 capturing image by a camera which is capable of being disposed at the vehicle with a field of view exterior of the vehicle. At this time, an example of a camera that captures an image may be a front camera disposed at the vehicle.

And the method of a vehicle alarm may include a step s1220 determining an estimated visible distance for the vehicle based on the image data by image processor which is operable to process the image data captured from the camera in the step s1210.

As an example, a visible distance may be estimated in step S1220 by recognizing a lane based on the captured image data, and then by calculating the visible distance based on length of the recognized lane.

As another example, a visible distance may be estimated in step S1220 based on a difference value comparing the predefined reference image data with the captured image data and a value of visible distance corresponding to the reference image data.

As another example, a visible distance may be estimated in step S1220 by determining a visible region based on the captured image data, and by using the information about extracted visible region.

As an example method in step 1220, which a visible region is determined based on the captured image data and a visible distance is estimated by using the information about extracted visible region, may include pre-processing the captured image data to generate a pre-processed image, extracting an edge image from the pre-processed image, and determining a visible region by extracting one or more estimated lane structures from the edge image and then by selecting a region with minimum longitudinal length including estimated lane structure more than predefined threshold ratio.

As another example method in step 1220, which a visible region is determined based on the captured image data and a visible distance is estimated by using the information about extracted visible region, may include extracting a plurality of image frames at a predefined time intervals in the captured image data, extracting image pixels changed between the plurality of image frames over than a predefined threshold value, and selecting a region with minimum longitudinal length including estimated lane structure more than predefined threshold ratio.

And the method of a vehicle alarm may include a step s1230 determining alarm area used to determine whether an alarm device alerts based on the estimated visible distance determined in step s1220.

As an example of the step s1230, a size of the alarm area may be determined in proportion to the estimated visible distance.

As another example of the step s1230, a size of the alarm area may be extended when the estimated visible distance is less than a predefined threshold value.

At this time, the size of the alarm area may be extended in the parallel direction of road lane passing by the vehicle. In addition, the size of the alarm area may be extended in the vertical direction of road lane passing by the vehicle.

As described above, even though it has been described that all elements that constitute the embodiments of the present disclosure are coupled as one element or operate while being coupled to one another, the present disclosure is not necessarily limited to the embodiments. That is, all elements may be selectively coupled as one or more elements and may operate while being coupled to one another within the scope of the purposes of the present disclosure.

The above-described embodiments of the present disclosure have been described only for illustrative purposes, and those skilled in the art will appreciate that various modifications and changes may be made thereto without departing from the essential features of the disclosure. Therefore, the embodiments of the present disclosure are not intended to limit, but are intended to illustrate the technical idea of the present disclosure, and the scope of the technical idea of the present disclosure is not limited by the embodiments. The scope of the present disclosure shall be construed on the basis of the accompanying claims in such a manner that all of the technical ideas included within the scope equivalent to the claims belong to the present disclosure.

What is claimed is:

1. An alarm system for a vehicle, the alarm system comprising:
    a camera operable to be disposed at the vehicle so as to have a field of view exterior of the vehicle, where the camera is configured to capture image data;
    an image processor operable to process image data captured from the camera;
    a plurality of sensors disposed at the vehicle for sensing at least one of front, side and rear so as to capture sensing data;
    an alarm device for alerting a driver of the vehicle when detecting an object located in blind spot of the rear of the vehicle; and,
    a controller including at least one of processor configured to process at least one of (i) processing result of the captured image data or (ii) the sensing data captured by the plurality of sensors;
    wherein the alarm system is operable to determine, based on the image data, an estimated visible distance of the driver from the vehicle,
    wherein the alarm system is operable to determine, based on the estimated visible distance, an alarm area which is used to determine whether the alarm device alerts,
    wherein the alarm system extracts a visible region based on the captured image data and determines the estimated visible distance based on the extracted visible region, and
    wherein the alarm system generates a pre-processed image by pre-processing the captured image data, generates an edge image from the pre-processed image, extracts one or more estimated lane structures from the edge image, and determines the visible region by selecting a region with a minimum longitudinal length including the estimated lane structure more than a predefined threshold ratio.

2. The alarm system of claim 1, wherein, the alarm system recognizes a lane or lanes based on the image data, and determines the estimated visible distance based on a length of the recognized lane.

3. The alarm system of claim 1, wherein, the alarm system determines the estimated visible distance based on a difference value of comparing the predefined reference image data with the captured image data, and based on a visible distance corresponding to the reference image data.

4. The alarm system of claim 1, wherein, the alarm system determines the estimated visible distance based on at least one of a longitudinal length of the visible region, a height of the camera from ground, or an angle between the camera and the ground.

5. The alarm system of claim 4, wherein, the estimated visible distance is in proportion to exponential of the longitudinal length of the visible region.

6. The alarm system of claim 4, wherein, the estimated visible distance is determined by substituting the longitudinal length of the visible region into a curved function which is extracted using a non-linear curve fitting method from a plurality of predefined samples.

7. The alarm system of claim 1, wherein, the alarm system extends a size of the alarm area when the estimated visible distance is less than or equal to a predefined threshold value.

8. A system for a vehicle, the system comprising:
a camera operable to be disposed at the vehicle so as to have a field of view exterior of the vehicle, where the camera is configured to capture image data; and
an image processor operable to process image data captured from the camera;
wherein the system is operable to determine, based on the image data, an estimated visible distance of a driver of the vehicle from the vehicle,
wherein the system determines a visible region based on the captured image data and determines the estimated visible distance of the vehicle based on the visible region, and
wherein the system extracts a plurality of image frames at a predefined time interval from the captured image data, extracts one or more image pixels changed between the plurality of image frames over than a predefined threshold value, and determines the visible region by selecting a region with a minimum longitudinal length including the estimated lane structure more than a predefined threshold ratio.

9. The system of claim 8, wherein, the system determines the estimated visible distance based on at least one of a longitudinal length of the visible region, a height of the camera from ground, or an angle between the camera and the ground.

10. The system of claim 9, wherein, the estimated visible distance is in proportion to exponential of the longitudinal length of the visible region.

11. The system of claim 9, wherein, the estimated visible distance is determined by substituting the longitudinal length of the visible region into a curved function which is extracted using a non-linear curve fitting method from a plurality of predefined samples.

12. A system for a vehicle, the system is operable to be disposed at the vehicle with a field of view exterior of the vehicle, the system comprising:
a camera configured to capture image data;
wherein the image data is used to determine an estimated visible distance of a driver of the vehicle from the vehicle,
wherein the estimated visible distance is used to determine an alarm area for determining whether an alarm device alerts,
wherein the system determines a visible region based on the captured image data and determines the estimated visible distance of the vehicle based on the visible region, and
wherein the system generates a pre-processed image by pre-processing the captured image data, generates an edge image from the pre-processed image, extracts one or more estimated lane structures from the edge image, and determines the visible region by selecting a region with a minimum longitudinal length including the estimated lane structure more than a predefined threshold ratio.

13. A system for a vehicle, the system comprising:
an image sensor disposed at the vehicle with a field of view exterior of the vehicle, where the image sensor is configured to capture image data;
a non-image sensor disposed at the vehicle so as to capture sensing data for sensing one of the objects adjacent at the vehicle; and
a domain controller disposed at the vehicle configured to process at least one of the image data captured by the image sensor and the sensing data captured by the non-image sensor;
wherein the domain controller is operable to determine, based in part on the processing of the image data captured by the image sensor, an estimated visible distance of a driver of the vehicle from the vehicle,
wherein the domain controller is operable to control one or more vehicle control systems selected from (i) a Blind Spot Detection (BSD), (ii) an Adaptive Cruise Control (ACC), (iii) a Lane Departure Warning System LDWS), (iv) a Lane Keeping Assist System (LKAS), and (v) a Lane Changing Assist System (LCAS) based in part on the processing of the sensing data captured by the non-image sensor and the estimated visible distance,
wherein the system determines a visible region based on the captured image data and determines the estimated visible distance of the vehicle based on the visible region, and
wherein the system extracts a plurality of image frames at a predefined time interval from the captured image data, extracts one or more image pixels changed between the plurality of image frames over than a predefined threshold value, and determines the visible region by selecting a region with a minimum longitudinal length including the estimated lane structure more than a predefined threshold ratio.

14. The system of claim 13, wherein, the system determines the estimated visible distance based on at least one of a longitudinal length of the visible region, a height of the camera from ground, or an angle between the camera and the ground.

15. A method for operating an alarm system for a vehicle, comprising:
capturing image data from a camera which is capable of being disposed at the vehicle with a field of view exterior of the vehicle;
generating a pre-processed image by pre-processing the captured image data, generating an edge image from the pre-processed image, extracting one or more estimated lane structures from the edge image, and determining a visible region by selecting a region with a minimum longitudinal length including the estimated lane structure more than a predefined threshold ratio;
determining an estimated visible distance of a driver of the vehicle from the vehicle, based on the visible region and based on the image data by an image processor which is operable to process the image data captured from the camera; and
determining, based on the estimated visible distance, an alarm area used to determine whether an alarm device alerts.

* * * * *